United States Patent [19]

Kimura

[11] Patent Number: 4,889,495

[45] Date of Patent: Dec. 26, 1989

[54] CONNECTING MECHANISM FOR MEMORY CARD

[75] Inventor: Masatoshi Kimura, Itami, Japan

[73] Assignee: Mitsubishi Denki Kabushiki Kaisha, Japan

[21] Appl. No.: 295,623

[22] Filed: Jan. 4, 1989

[30] Foreign Application Priority Data

Sep. 8, 1988 [JP] Japan ................................ 63-223545

[51] Int. Cl.$^4$ ........................... H01R 3/06; H05K 1/04
[52] U.S. Cl. ........................................ 439/60; 361/399
[58] Field of Search ..................... 439/56, 60, 61, 62, 439/79, 80, 92, 101, 924; 361/9, 399, 413

[56] References Cited

U.S. PATENT DOCUMENTS

| | | | |
|---|---|---|---|
| 3,432,795 | 3/1969 | Jayne | 439/60 |
| 3,710,197 | 1/1973 | Olds et al. | 439/62 X |
| 3,973,817 | 8/1976 | Stalley et al. | 439/924 X |
| 4,079,440 | 3/1978 | Ohnuma et al. | 439/924 X |
| 4,510,553 | 4/1985 | Faultersack | 361/399 X |
| 4,574,332 | 3/1986 | Calabro | 361/413 |

FOREIGN PATENT DOCUMENTS

| | | | |
|---|---|---|---|
| 3134278 | 3/1983 | Fed. Rep. of Germany | 439/62 |
| 2512283 | 3/1982 | France | 439/924 |

OTHER PUBLICATIONS

"Dual-Level Printed Circuit Board Edge Connector" Research Disclosure, Aug. 1987, No. 280, Sequential Contact Mating IBM Technical Disclosure Bulletin, vol. 31, No. 10, Mar. 1989.

Primary Examiner—William Briggs
Attorney, Agent, or Firm—Leydig, Voit & Mayer

[57] ABSTRACT

Disclosed is a connecting mechanism for a memory card for connecting a detachable memory card and terminal equipment. The connecting mechanism comprises: a pair of connectors respectively provided on the card side and the terminal equipment side, in which a difference in the length of terminals is provided between a grounding terminal and terminals other than the grounding terminal in such a manner as to establish an electrical sequence in which, during insertion of the memory card, the grounding terminal makes an electrical contact in advance of the other the terminals and is electrically separated by lagging behind the other terminals; a card guide provided on the terminal equipment side and having predetermined dimensions for restricting an angle of inclination of the memory card during insertion or withdrawal thereof so as to obtain the electrical sequence; and a unilateral or bilateral terminal equipment-side buffer circuit provided for all input/output lines excluding a power input line and a grounding line in the terminal equipment, whereby the insertion or withdrawal of activated lines is made possible with respect to the input/output lines excluding a card enable signal line.

6 Claims, 6 Drawing Sheets

CONNECTING MECHANISM FOR MEMORY CARD

BACKGROUND OF THE INVENTION

1. Field of the Invention:

The present invention relates to a connecting mechanism between a terminal or the like of a personal computer or an on-line system and a memory card which is connected detachably thereto.

2. Description of the Related Art:

FIG. 1 schematically illustrates a configuration of a conventional connecting mechanism for a memory card, and a state in which a memory card 21 is connected to terminal equipment (not shown). The memory card 21 comprises a semiconductor memory 10, a buffer circuit 1, a supply voltage detecting circuit 11, a reverse charging prevention diode 12, a current limiting resistor 13, a battery 14, and a card-side connector 16. A static RAM is used as the semiconductor memory 10, and a buffer circuit 1 is constituted by an IC. The card-side connector 16 mounted on the memory card 21 has card-side connector terminals $16a$–$16n$. All the terminals $16a$ to $16n$ have the same length. Meanwhile, a terminal equipment-side connector 17 is mounted on the side of the terminal equipment and comprises terminal equipment-side connector terminals $17a$ to $17n$. All of these terminals $17a$ to $17n$ have the same length. A terminal equipment-side power input line 18 supplies power to the memory card 21, and the voltage of a grounding line 20 constitutes a reference voltage for the terminal equipment and the memory card 21 and is normally 0 V. Input/output lines $19b$ to $19_{n-1}$ are used for input and output signals for writing in and reading from the semiconductor memory 10. In addition, pull-down resistors $7b$ to $7_{n-2}$ respectively connected to output lines $19b$ to $19_{n-2}$ between the card-side connector 16 and the buffer circuit 1 as well as a pull-up resistor $7_{n-1}$ connected to a card enable signal line $19_{n-1}$ among the input/output lines are designed to stabilize the levels of the input/output lines $19b$ to $19_{n-1}$ on the side of the card 21 to a low (L) level or a high (H) level.

Next, a description will be given of the operation of the prior-art connecting mechanism. In FIG. 1, when the memory card 21 is connected to the terminal equipment and the voltage of the power input line 18 reaches a predetermined level, the supply voltage detecting circuit 11 supplies to an internal power line 15 the power from the power input line 18, supplies an ON/OFF signal $11a$ to the buffer circuit 1, and sets the buffer 1 in a connected state. In addition, when the voltage of the power input line 18 drops below a predetermined level, the supply voltage detecting circuit 11 cuts off the power input line 18 electrically and also sets the buffer circuit 1 in a cut off state by mean of the ON/OFF signal $11a$. When the voltage of the power input line 18 reaches a predetermined level or more, the power from the power input line 18 is supplied to the internal power line 15, and the buffer circuit 1 is set in a connected state. The voltage Vbb of the battery 14 is normally 3 V, but no current flows from the internal power line 15 through the action of the reverse charging prevention diode 12. In this state, the writing and reading of data with respect to the semiconductor memory 10 from the terminal equipment is possible through the input/output lines $19b$ to $19_{n-1}$. The input/output lines $19b$ to $19_{n-1}$ include an address bus, a data bus, a control signal line (including the card enable signal line $19_{n-1}$), and the like. Since the operation of the semiconductor memory 10 is generally known, a description thereof will be omitted. Next, when the voltage from the power input line 18 has reached a predetermined level or below, the power from the power input line 18 on the side of the terminal equipment is cut off by the operation of the supply voltage detecting circuit 11, and, at the same time, the buffer circuit 1 is set in a cut-off state by the action of the ON/OFF signal $11a$. Accordingly, the power from the battery 14 is supplied to the internal power line 15 through the current limiting resistor 13 and the reverse charging prevention diode 12, so that the data stored in the semiconductor memory 10 is retained. The voltage of the power input line 18 is generally 4.5 to 5.5 V, while a predetermined level at which the supply voltage detecting circuit 11 effects a changeover of the power is in the neighborhood of 3.9 to 4.2 V.

In the above, the basic operation of the memory card 21 has been described. Next, a description will be given of a case where the memory card 21 is inserted into or removed from the terminal equipment. Specifically, a description will be given of a case where the memory card 21 is pulled out in a state in which the power is supplied from the terminal equipment to the memory card 21 via the power input line 18 and the power is supplied to the internal power line 15 by means of the supply voltage detecting circuit 11 as well as in a line-activated state in which an "H" level signal is applied to the card enable signal line $19_{n-1}$ (at which the memory card 21 is in an non-operative state), which is one of the input/output lines from the terminal equipment, while an arbitrary signal is applied to the other input/output lines $19b$ to $19_{n-2}$. When the grounding line 20 is separated in advance of the other terminals and when one of the signals of the input/output lines $19b$ to $19_{n-2}$ is at "H" level and another is at "L" level, a loop current $I_1$ (see FIG. 2) flows which passes through the memory card 21 from the terminal equipment and then returns to the terminal equipment. As a result, as shown in FIG. 1, an abnormal current I flows from the battery 14 via the current limiting resistor 13, the reverse charging prevention diode 12, the internal power line 15, the buffer circuit 1 and the semiconductor memory 10. If it is assumed that the value of this abnormal current I is I, the voltage of the battery 14 is Vbb, and the resistance of the current limiting resistor 13 is R, the voltage Vdd of the internal power line 15 drops instantly to the value shown by the following Formula (1):

$$Vdd = Vcc - \{R \cdot I + (\text{forward voltage of the diode } 12)\} \quad (1)$$

The value of R is generally about 1.5 kΩ. On the other hand, since the minimum holding voltage for the data stored in the semiconductor memory 10 is 2 V, if it is assumed that the abnormal current I is 1 mA, and the forward voltage of the reverse charging prevention diode 12 is 0.6 V, the voltage Vdd of the internal power line 15 becomes 0.9 V and becomes smaller than the minimum holding voltage for holding the data stored in the semiconductor memory 10. Therefore, the data stored in the semiconductor memory 10 will disappear. The value of this abnormal current I becomes greater than 1 mA.

Referring now to FIG. 2, a description will be given of the mechanism of occurrence of the above-described loop current. FIG. 2 illustrates two elements in the buffer circuit 1 so as to facilitate an understanding of the mechanism of occurrence of the loop current. To facilitate the description, the internal structures of buffer elements 1b, 1c are respectively shown as equivalent circuits comprising only input circuits such as diodes 2b, 2c and buffer portions 3b, 3c. In addition, FIG. 2 shows input signal lines 5b, 5c from the card-side connector 16 and output signal lines 6b, 6c to the semiconductor memory 10. As described above, the buffer circuit 1 is constituted by an IC such as a CMOS IC, a TTL IC, or an LSTTL IC, but parasitic transistors 4b, 4c shown by broken lines in FIG. 2 are employed naturally. As described above, if, during the withdrawal of the memory card 21, the grounding line 20 is separated in advance of the other terminals, and if one of the signals of the input/output lines $19b$ to $19_{n-2}$ is at "H" level and another is at "L" level, the "H" level signal input from the terminal equipment via the input signal line 5b flows from the pull-down resistor 7b to ground. This current flows from the internal grounding line 9 to between the base and the emitter of the parasitic transistor 4c and constitutes a base current, and further passes through the input signal line 5c and returns to the terminal equipment, thereby constituting the loop current $I_1$. Consequently, an overcurrent $I_2$ flows from the internal power input line 8 to between the collector and the emitter of the parasitic transistor to the input signal line 5c. Each internal power input line 8 is connected to the internal power line 15 shown in FIG. 1. Accordingly, as described above, the abnormal current I flows to the internal power line 15 via the battery 14, the current limiting resistor 13, and the reverse charging prevention diode 12. In cases where the grounding line 20 makes contact by lagging behind the other terminals during insertion of the memory card 21, this abnormal current I occurs with a similar mechanism.

At present, as for the terminals 17a to 17n of the terminal equipment-side connector 17, those having the same length or having some differences in the length are used. However, there are manufacturing tolerances in the dimensions of the terminals 17a to 17n. In addition, an electrical sequence for coping with diagonal insertion and withdrawal is not provided so as to allow the grounding terminal to make contact in advance of the other terminals during insertion and to be separated by lagging behind the other terminals during withdrawal. Therefore, there is a possibility that the data stored in the semiconductor memory 10 may disappear.

On the other hand, as shown in FIG. 3, during the insertion and withdrawal of the memory card 21, chattering occurs in a signal (a) of the terminals other than the grounding terminal and a grounding signal (b) of the grounding terminal, respectively. With respect to the period of occurrence of this chattering, no electrical sequence has been adopted by taking into account the aforementioned manufacturing tolerances in the length of terminals and the diagonal insertion. In addition, this chattering often exerts an adverse effect on the terminal equipment, possibility resulting in a malfunctioning of a CPU on the terminal equipment side. The electrical sequence referred to here means that the grounding terminal always makes contact in advance of the other terminals during insertion, and is always released after the other terminals during withdrawal.

As described above, in the conventional connecting mechanism, an electrical sequence is not necessarily adopted in the terminals 16a to 16n and 17a to 17n of the card- and terminal equipment-side connectors 16, 17. Accordingly, during insertion and withdrawal with the lines of the memory card 21 kept in an active state, the loop current can flow from the terminal equipment and return to the terminal equipment via the buffer circuit 1 of the memory card 21. As a result, an abnormal current can flow from the grounding terminal via the battery 14, the current limiting resistor 13, and the reverse charging prevention diode 12. Therefore, since this abnormal current causes the voltage of the internal power line 15 to drop, there has been the possibility that the data stored in the semiconductor memory 10 may disappear and the buffer circuit 1 or the semiconductor memory 10 may be destroyed. Meanwhile, with respect to the terminal equipment as well, if the CPU on the terminal equipment side and the memory card 21 are directly connected to each other, there has been a problem in that a malfunctioning can occur in the CPU of the terminal equipment due to the chattering occurring during insertion or withdrawal of the memory card 21.

SUMMARY OF THE INVENTION

Accordingly, an object of the present invention is to provide a connecting mechanism for a memory card which is capable of establishing a positive electrical sequence by providing a difference in length between a grounding terminal and the other terminals of connectors disposed on the card and terminal equipment sides and by establishing conditions for a card guide with respect to diagonal insertion or withdrawal of the memory card, thereby overcoming the above-described drawbacks of the conventional art.

Another object of the present invention is to provide a connecting mechanism for a memory card which is capable of eliminating the effect of the chattering occurring during insertion or withdrawal on terminal equipment by inserting a terminal equipment-side unilateral or bilateral buffer circuit with respect to all the input/output lines excluding a power input line and a grounding line on the terminal equipment side, thereby permitting insertion or withdrawal of the memory card in a state in which power and/or signals are applied from the terminal equipment, i.e., in a line-activated state (with a card enable signal line kept at an non-operative level).

To these ends, in accordance with the present invention, there is provided a connecting mechanism for a memory card for connecting a detachable memory card and terminal equipment, comprising: connector means including a card-side connector and a terminal equipment-side connecter, in which a difference in the length of terminals is provided between a grounding terminal and terminals other than the grounding terminal in such a manner as to establish an electrical sequence in which, during insertion of the memory card, the grounding terminal makes an electrical contact in advance of the other terminals and is electrically separated by lagging behind the other terminals; card guide means provided on the terminal equipment side and having predetermined dimensions for restricting an angle of inclination of the memory card during insertion or withdrawal thereof so as to obtain the electrical sequence; and a unilateral or bilateral terminal equipment-side buffer circuit provided for all input/output lines excluding a power input line and a grounding line in the terminal equipment, whereby the insertion or withdrawal of activated lines is made possible with respect to the input/output lines excluding a card enable signal line.

In the present invention, a difference in length between the respective terminals on the card- and terminal equipment-side connectors is provided by taking into account manufacturing tolerances of the terminals and diagonal insertion and withdrawal. As a result, it is possible to establish a positive electrical sequence. In addition, with respect to the occurrence of chattering involved in insertion or withdrawal, the unilateral or bilateral buffer circuit is inserted in all the input/output lines excluding the power input line and the grounding line on the terminal equipment side. Hence, the data stored in the semiconductor memory can be protected positively during insertion or withdrawal of activated lines, and no effect of the chattering, which can otherwise occur during insertion or withdrawal of the memory card, is exerted thereto.

The above and other objects, features and advantages of the present invention will become more apparent from the following detailed description of the invention when read in conjunction with the accompanying drawings.

DESCRIPTION OF THE PREFERRED EMBODIMENT

Figure 1:
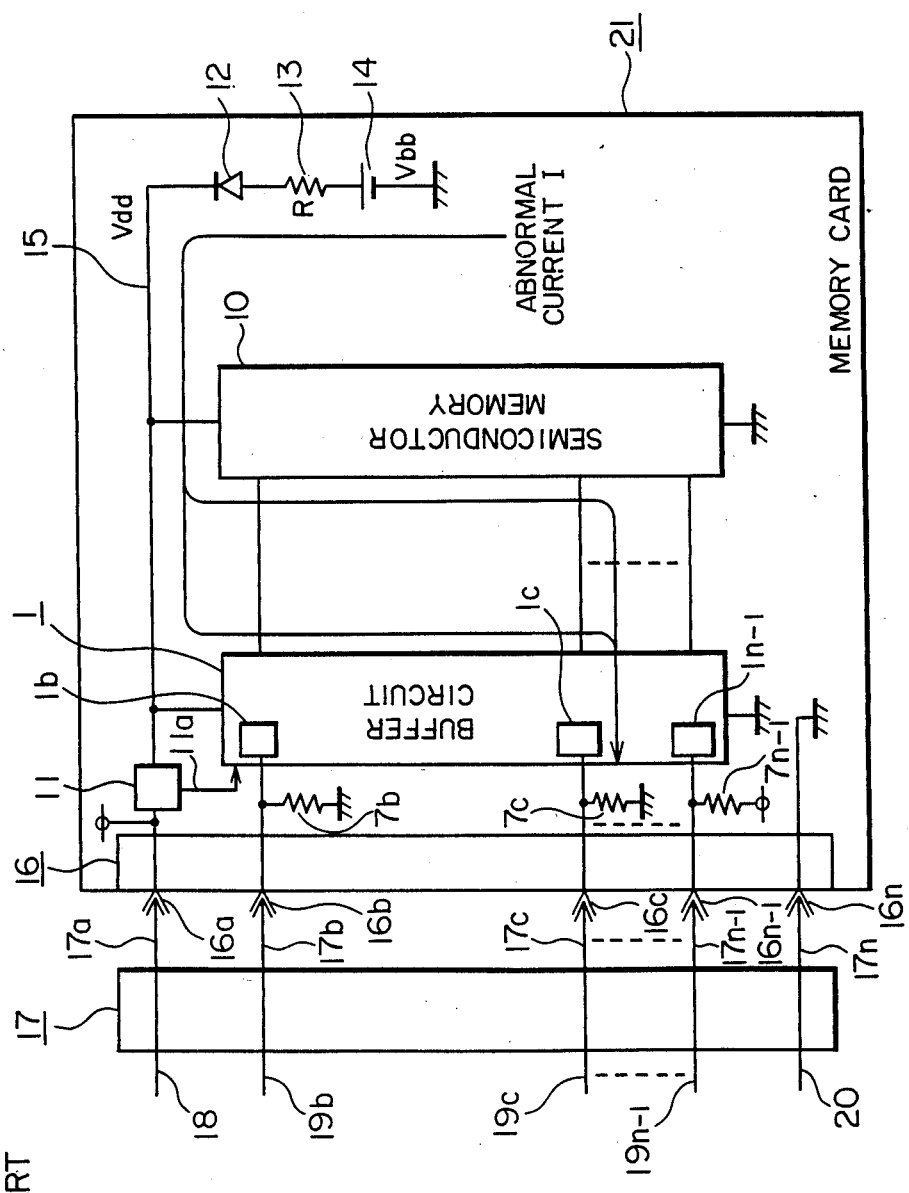
FIG. 1 is a schematic diagram illustrating a configuration of a conventional connecting mechanism for a memory card.
Figure 4:
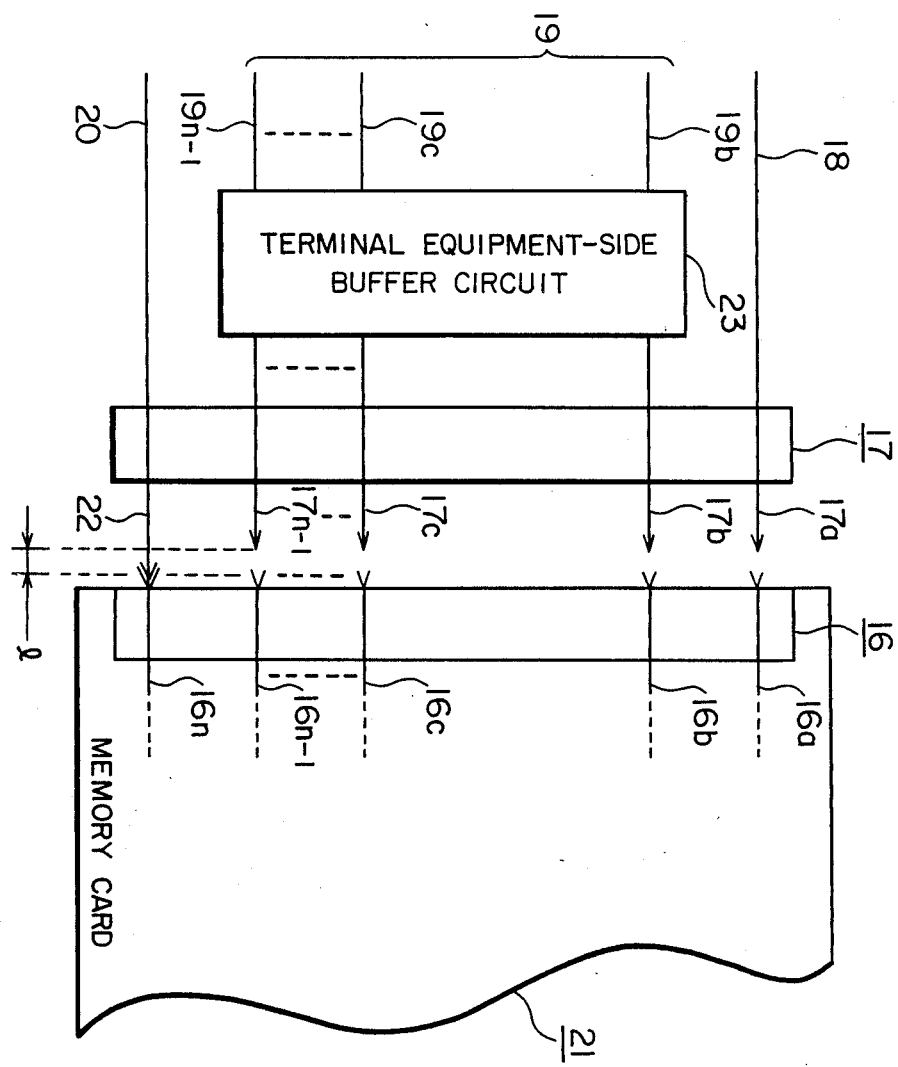
FIG. 4 is a schematic diagram illustrating a configuration of a connecting mechanism for a memory card in accordance with an embodiment of the present invention.

Referring now to the accompanying drawings, a description will be given of an embodiment of the present invention. FIG. 4 is a schematic diagram illustrating a configuration of a connecting mechanism for a memory card in accordance with an embodiment of the present invention. In this drawing, the length of a grounding terminal 22 of the terminal equipment-side connector 17 is made longer than the length of the other terminals $17a$ to $17_{n-1}$ thereof by l so that an electrical sequence can be established positively irrespective of the manufacturing tolerances of the terminal equipment-side connector 17 and the card-side connector 16 (in particular, manufacturing tolerances of the dimensions of the connector terminals) as well as the diagonal insertion and withdrawal of the memory card 21. In addition, a terminal equipment-side buffer circuit 23 provided with respect to the terminal equipment-side input/output lines $19b$ to $19_{n-1}$ is designed to eliminate the effect of the chattering occurring due to the insertion or withdrawal of the memory card 21 on, for instance, a CPU (not shown) of the terminal equipment. The other arrangements are basically similar to those of the conventional connecting mechanism shown in FIG. 1, so that an illustration of such arrangements and a description thereof will be omitted.

Figure 2:
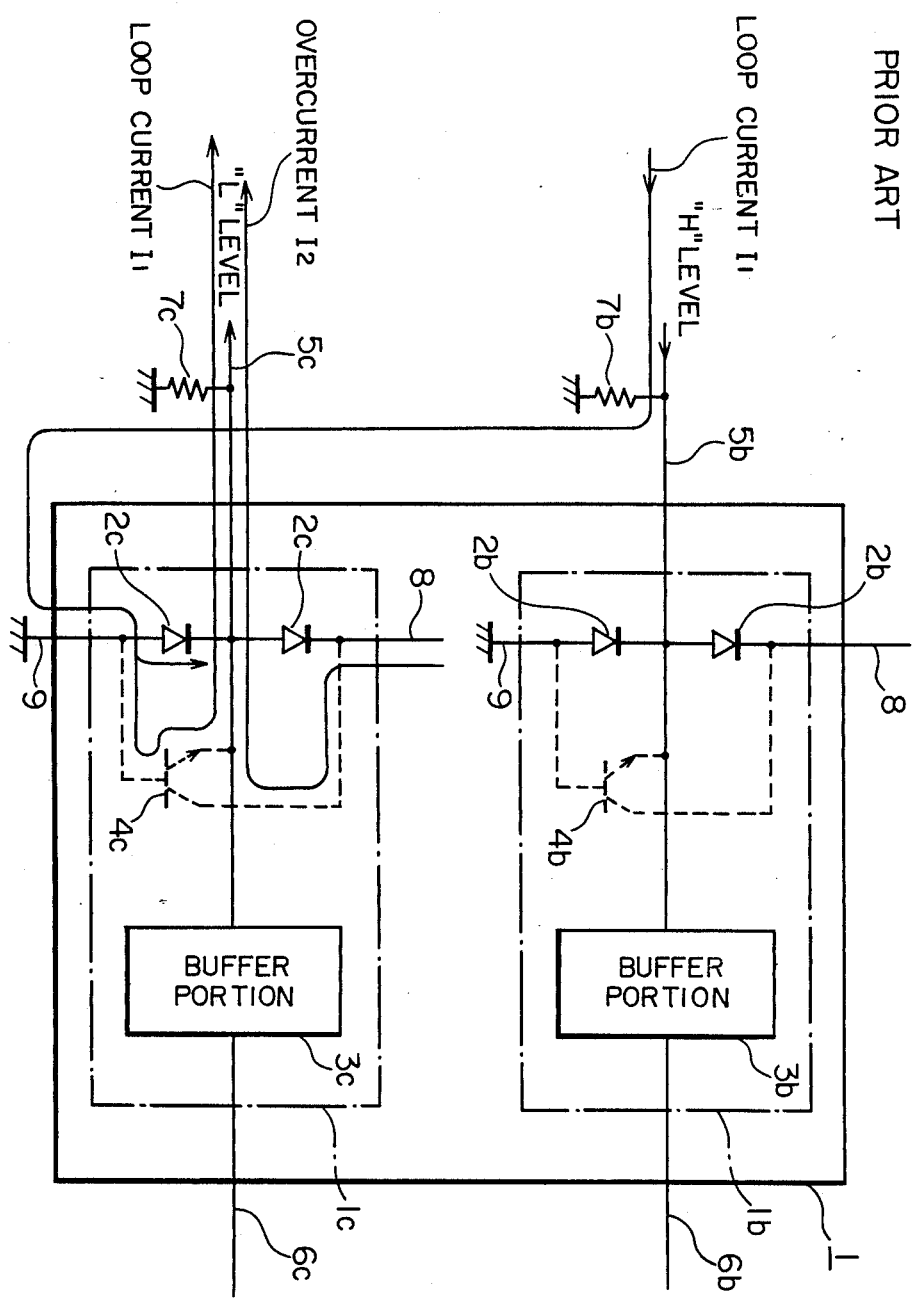
FIG. 2 is a diagram illustrating a mechanism of occurrence of a loop current due to the use of a parasitic transistor.
Figure 3:
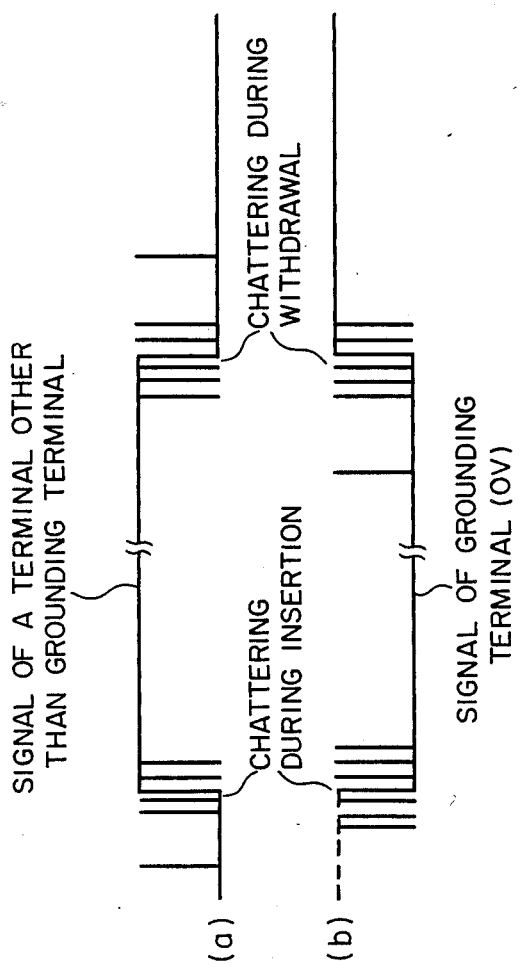
FIG. 3 is a diagram illustrating the state of signals during insertion and withdrawal of the memory card in the connecting mechanism shown in FIGS. 1 and 2.
Figure 5:
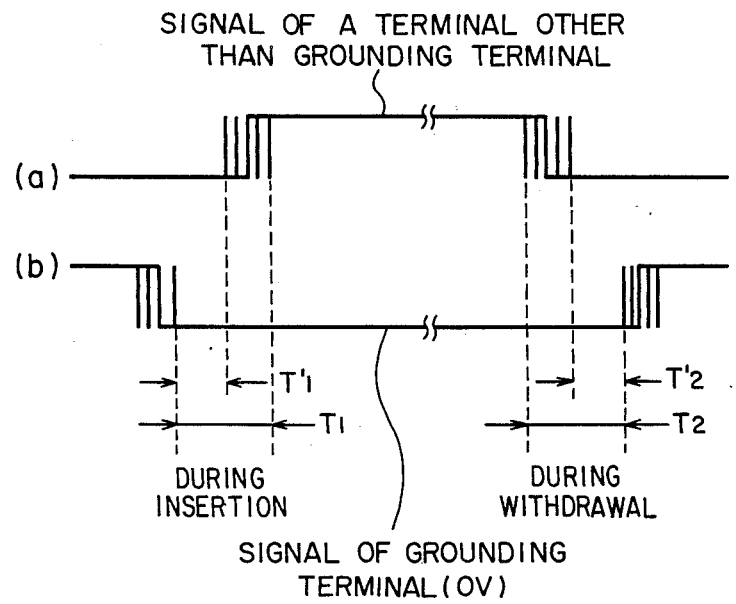
FIG. 5 is a diagram illustrating the state of signals during insertion and withdrawal of the memory card in the connecting mechanism shown in FIG. 4.

A description will be given of the operation. In the connecting mechanism between the memory card and the terminal equipment shown in FIG. 4 in accordance with the present invention, since the grounding terminal 22 is longer than the other terminals $17a$ to $17_{n-1}$ by l, when the memory card 21 is withdrawn from the terminal equipment in a line-activated state (with the card enable signal constantly kept at a non-operative level), the grounding terminal 22 is not separated from the terminal $16n$ before the other terminals $17a$ to $17_{n-1}$ are separated from the terminals $16a$ to $16_{n-1}$ of the card-side connector 16. This state is shown in FIG. 5. Namely, as shown in FIG. 5, even if chattering waveforms resulting from the separation of the terminals occur in the signal (a) of the terminals other than the grounding terminal when the memory card 21 is withdrawn from the terminal equipment, the signal (b) of the grounding terminal maintains 0 V. Meanwhile, during insertion of the memory card 21 as well, the grounding terminal 22 always makes contact in advance of the other terminals $17a$ to $17_{n-1}$. Accordingly, since the grounding level 0 V between the terminal equipment and the memory card 21 is at a stable level during the respective durations $T_1$ and $T_2$ of insertion and withdrawal of the memory card 21, the effect of the parasitic transistors $4b$, $4c$ shown in FIG. 2 can be ignored. Namely, the loop current $I_1$ shown in FIG. 2 flows from the pull-down resistor $7b$ to ground, but that current does not flow to the parasitic transistor $4c$ and returns to the terminal equipment via the normal grounding terminal 22 shown in FIG. 4. Accordingly, the abnormal current I shown in FIG. 1 does not occur, and since the voltage of the internal power line 15 (see FIG. 1) does not drop to a predetermined value or below during insertion and withdrawal, the data stored in the semiconductor memory 10 can be retained positively. In addition, on the terminal equipment side, since the terminal equipment-side buffer circuit 23 is inserted for the input/output lines $19b$ to $19_{n-1}$, no effect of the chattering caused by insertion and withdrawal is exerted.

Figure 6:
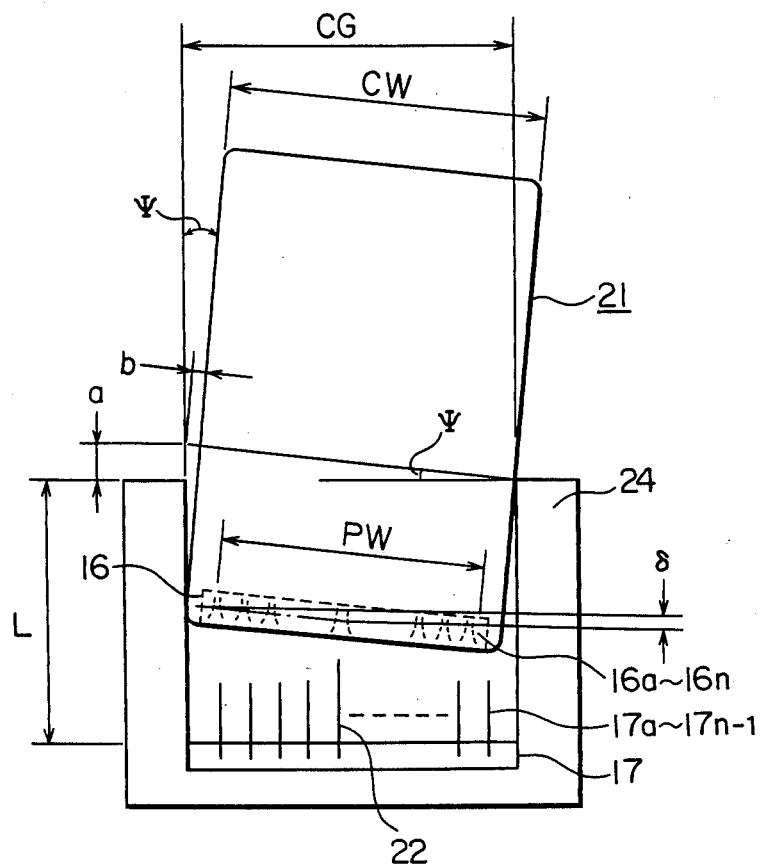
FIG. 6 is a diagram illustrating the diagonal insertion and withdrawal of the memory card.

A description will now be given of a means for obtaining an electrical sequence such as the one shown in FIG. 5. To obtain a positive electrical sequence, it is necessary to compensate the manufacturing tolerances of the dimensions of the terminals $16a$ to $16n$, $17a$ to $17_{n-1}$ and 22 of the card- and terminal equipment-side connectors 16, 17 as well as a difference in the equivalent length of terminals involved in the diagonal insertion and withdrawal of the memory card 21, as shown in FIG. 6. In practice, however, the external dimensions of the memory card 21 are very small with a width of 54 mm, a length of 86 mm, and a thickness of 2-4 mm or thereabout. In contrast, the number of terminals is very numerous at 30 to 68 pins, and the overall size of the card must be made as thin and compact as possible. Therefore, it is difficult to secure the electrical sequence, such as the one explained in connection with FIG. 5, by using the card-side connector 16 alone. In addition, it is difficult to secure the electrical sequence by using the terminals $17a$ to $17_{n-1}$ of the terminal equipment-side connector 17 alone. For this reason, the connecting mechanism in accordance with the present invention is provided with a card guide 24 having predetermined dimensions, as shown in FIG. 6, thereby to obtain a realizable difference in the length of terminals.

Figure 7:
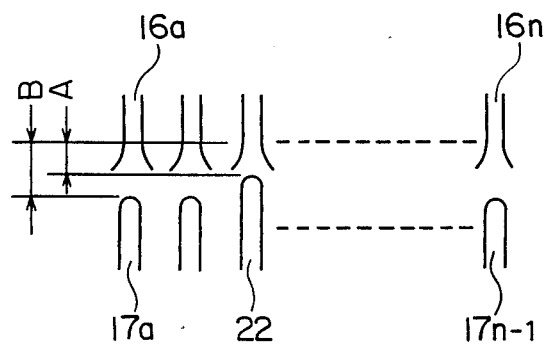
FIG. 7 is a diagram illustrating a difference in the length of terminals in a case where the memory card is inserted into or withdrawn from a card guide orthogonally therewith.

A description will now be given of variations in the length of terminals owing to the manufacturing tolerances of the dimensions of terminals. As shown in FIG. 7, card inserting and withdrawing forces are taken into consideration with respect to the configuration of distal end portions of the terminal equipment-side connector terminals $17a$ to $17_{n-1}$ and the grounding terminal 22, and the opening portions at the distal ends of the card-side connector terminals $16a$ to $16n$ are expanded slightly, while the distal end portions of the terminal equipment-side connector terminals $17a$ to $17_{n-1}$ are rounded slightly. For this reason, tolerances of the dies and tolerances during assembly are, without fail, related closely to the arrangement of these terminals. FIG. 7 shows a difference in the length of terminals when the memory card 21 is inserted orthogonally into the card guide 24 (see FIG. 6) on the terminal equipment side. If a cumulative tolerance in manufacture is assumed to be M, the difference in the length of terminals with this factor taken into account can be expressed by the following Formula (2):

$$\text{Difference in the length of terminals} = (B-A) \pm M \quad (2)$$

A description will now be given of a reduction in the difference in the equivalent length of terminals. Let us consider a case where the grounding terminal 22 having a long terminal is located adjacent to, for instance, the center of the connector, as shown in FIG. 6. A deviation $\delta$ of the position of a contact with respect to the card guide 24 in the vertical direction can be determined as follows:

$$\delta = (PW/2) \cdot \sin \Psi \quad (3)$$

where $\Psi$ is an angle of inclination of the card; PW is a distance between the terminals $16a$ to $16n$. If it is assumed that the pitch between the adjacent terminals is 1.27 mm, and that the number of pins is 30, we have $$PW = 1.27 \times 29 = 36.83$$

As described above, since it is necessary to make compact the card- and terminal equipment-side connectors 16, 17, the difference in the length of terminals ($=B-A$) cannot be made long in an unrestrained manner and is restricted physically. For this reason, it is necessary to determine a realizable difference in the length of terminals after determining the deviation $\delta$ of the position of the contact with respect to the angle $\Psi$ of inclination of the card, in a case where the grounding terminal 22 is disposed adjacent to the center of the the terminal equipment-side connector 17, as shown in FIG. 6. An example of the relationships between the deviation $\delta$ of the position of the contact with respect to the angle $\Psi$ of inclination of the card is shown in Table 1. It is necessary to determine a realizable difference in the length of terminals by taking into account the value of the angle $\Psi$ of inclination of the card

TABLE 1

| $\Psi$ (degree) | $\delta$ (mm) |
|---|---|
| 0.5 | 0.1662 |
| 1.0 | 0.3324 |
| 1.5 | 0.4986 |
| 2.0 | 0.6649 |
| 2.5 | 0.8313 |

TABLE 1-continued

| $\Psi$ (degree) | $\delta$ (mm) |
|---|---|
| 3.0 | 0.9979 | and the manufacturing tolerance M. A length L of the card guide 24 necessary when the angle $\Psi$ of inclination is prescribed can be expressed by Formula (3) below.

$$a = CG \tan \Psi$$

$$b = (CG/\cos \Psi) - CW$$

Accordingly, we have $$L = [(b/a) \cdot (CW + b)] - a \quad (3)$$

where a is a longitudinal deviation when the memory card is inserted or withdrawn in a diagonal direction, b is a transverse deviation when the memory card is inserted or withdrawn in a diagonal direction, CG is the width of the card guide 24, and CW is the width of the memory card 21. Thus, by determining the guide width CG and the length L of the card guide 24 which is realizable, from the angle $\Psi$ of inclination of the memory card and other factors mentioned above, it is possible to establish an electrical sequence positively with respect to the diagonal insertion and withdrawal, as shown in FIG. 6.

An example of a practicable difference in the length will be described by generally taking into account the actual use of the memory card. If it is assumed that the manufacturing tolerance is $\pm 0.47$ mm and the angle $\Psi$ of inclination of the memory card is 1.0° (degree), the deviation $\delta$ of the position of the contact can be determined from Table 1 as 0.3324 mm. Therefore, we have Required difference in the length of terminals = 0.3324 + 0.47 = 0.8024 mm.

In addition, a minimum of 1 mm is necessary as a realizable difference in the length of terminals. At worse, the following difference in the length of terminals remains as follows:

Difference in the length of terminals at worse
= 1.0 − 0.3324 − 0.47 = 0.1976
= approx. 0.2 mm In this case, the length L of the card guide becomes 16.76 mm, and the guide width CG thereof becomes 54.0−54.3 mm. Since these are realizable values, no problem is presented. In addition, with respect to the aforementioned leeway of 0.2 mm, if it is assumed that the memory card is inserted or withdrawn at a rate of 1 m/sec, there is an electrical leeway of 200 $\mu$s. This corresponds to the time durations $T_1'$, $T_2'$ during which chattering waveform signals are generated in the grounding line (b) and the input/output lines (a) other than the grounding line (a), shown in FIG. 5, at the tie of insertion and withdrawal of the memory card, and that value is sufficient to prevent the flow of an abnormal current. Furthermore, with respect to the chattering, it is possible to reduce the amount of chattering to an extremely small level by the improvements made on the configuration of distal end portions of the card-side connector terminals $16a$ to $16n$, the terminal equipment-side connector terminals $17a$ to $17_{n-1}$, and the grounding terminal 22. In addition, even if chattering occurs, the CPU (not shown) of the terminal equipment is prevented from malfunctioning by virtue of the operation of the buffer circuit 23 connected to the terminal equipment-side input/output lines 19b to $19_{n-1}$.

In the above, a description has been of the difference in the length of terminals for establishing a positive electrical sequence as well as the dimensional conditions of the card guide. By virtue of such an arrangement, the data stored in a semiconductor memory constituted by such as a static RAM or the like does not disappear when the activated lines of the memory card-side connector are inserted into or withdrawn from the terminal equipment-side connector, so that the stored data can be protected positively. Thus, it will be appreciated that, if the difference between the length of a long terminal (grounding terminal) and the length of short terminals (those other than the grounding terminal) is set to a minimum of 1 mm, the length L of the card guide is set to 16.72 mm or more, and the guide width CG is set to 54.0–54.3 mm, a positive electrical sequence can be established even if the manufacturing tolerances of the connector and diagonal insertion and withdrawal are taken into consideration.

It should be noted that although the foregoing description has been given with respect to a memory card, the present invention can be applied to all types of compact, portable storage apparatus.

Also, the storage portion, i.e., the semiconductor memory, is not restricted to a static RAM, and other types of semiconductor device may be used.

In the above-described embodiment, a description has been given of two types of length, but the present invention can be applied to terminals having three different or more types of length.

In addition, although a difference in length is provided between the grounding terminal and the other terminals in male terminals of the terminal equipment-side connector, the difference in length may be provided on the female terminals of the card-side connector. Also, the position of the long terminal, i.e., the grounding terminal, is not restricted to the vicinity of the center of the connector, and may be disposed elsewhere in the connector. For instance, if the grounding terminal is located at an end of the connector, the above-described calculational expressions differ. In such a case, however, since the grounding terminals are in many cases located on both sides of the connector, the conditions become more lenient than those determined from the above-described calculational expressions.

Furthermore, the present invention demonstrates a similar effect when applied to a connecting mechanism for a memory card in which female terminals are provided on the terminal equipment-side connector, and male terminals on the card-side connector.

As described above, in accordance with the present invention, the length of the grounding terminal is made longer than that of the terminals other than the grounding terminal so that the grounding terminal is connected first during insertion, and is separated last during withdrawal. At the same time, the length and width of the terminal equipment-side card guide are restricted so that a positive electrical sequence can be established. Furthermore, a buffer circuit for preventing the effect of the chattering occurring during insertion or withdrawal of the memory card is provided for the terminal equipment-side input/output lines. Accordingly, it is possible to prevent the occurrence of a loop current which flows from the terminal equipment and returns to the same via the memory card and which introduces an abnormal current flowing via the battery of the memory card. Therefore it is possible to obtain an advantage that it is possible to provide a connecting mechanism for a memory card in which the data stored in the memory card can be protected positively since an abnormal current is prevented from flowing in the memory card, and no destruction or damage takes place in semiconductor devices such as the storage devices and the CPU on the memory card and terminal equipment sides.

Accordingly, the present invention should not be confined to the above-described embodiment and various modifications are possible without departing from the spirit of the invention which is defined solely in the appended claims.

What is claimed is:

1. A connecting mechanism for a memory card for connecting a detachable memory card and terminal equipment, comprising:
    connector means including a card-side connector and a terminal equipment-side connecter, in which a difference in the length of terminals is provided between a grounding terminal and terminals other than said grounding terminal in such a manner as to establish an electrical sequence in which, during insertion of said memory card, said grounding terminal makes an electrical contact in advance of the other said terminals and is electrically separated by lagging behind said other terminals;
    card guide means provided on said terminal equipment side and having predetermined dimensions for restricting an angle of inclination of said memory card during insertion or withdrawal thereof so as to obtain said electrical sequence; and
    a unilateral or bilateral terminal equipment-side buffer circuit provided for all input/output lines excluding a power input line and a grounding line in said terminal equipment,
    whereby the insertion or withdrawal of activated lines is made possible with respect to said input/output lines excluding a card enable signal line.

2. A connecting mechanism for a memory card according to claim 1, wherein the external dimensions of said memory card are approximately 54×86×2–4 mm in terms of the width×length×thickness, the length of said card guide means is 16.72 or more, the guide width thereof is approximately 54.0–54.3 mm, and a difference in the length of said connector terminals in said connector means is 1.0 mm or more.

3. A connecting mechanism for a memory card according to claim 1, wherein said terminals of said terminal equipment-side connector of said connector means are male terminals and said terminals of said card-side connector are female terminals, said male terminals of said terminal equipment-side connector being provided with said difference in the length of said terminals.

4. A connecting mechanism for a memory card according to claim 1, wherein said terminals of said terminal equipment-side connector of said connector means are male terminals and said terminals of said card-side connector are female terminals, said female terminals of said card-side connector being provided with said difference in the length of said terminals.

5. A connecting mechanism for a memory card according to claim 1, wherein said terminals of said terminal equipment-side connector of said connector means are female terminals and said terminals of said card-side connector are male terminals, said male terminals of said card-side connector being provided with said difference in the length of said terminals.

6. A connecting mechanism for a memory card according to claim 1, wherein said terminals of said terminal equipment-side connector of said connector means are female terminals and said terminals of said card-side connector are male terminals, said female terminals of said terminal equipment-side connector being provided with said difference in the length of said terminals.

* * * * *